United States Patent Office
2,870,331
Patented Jan. 20, 1959

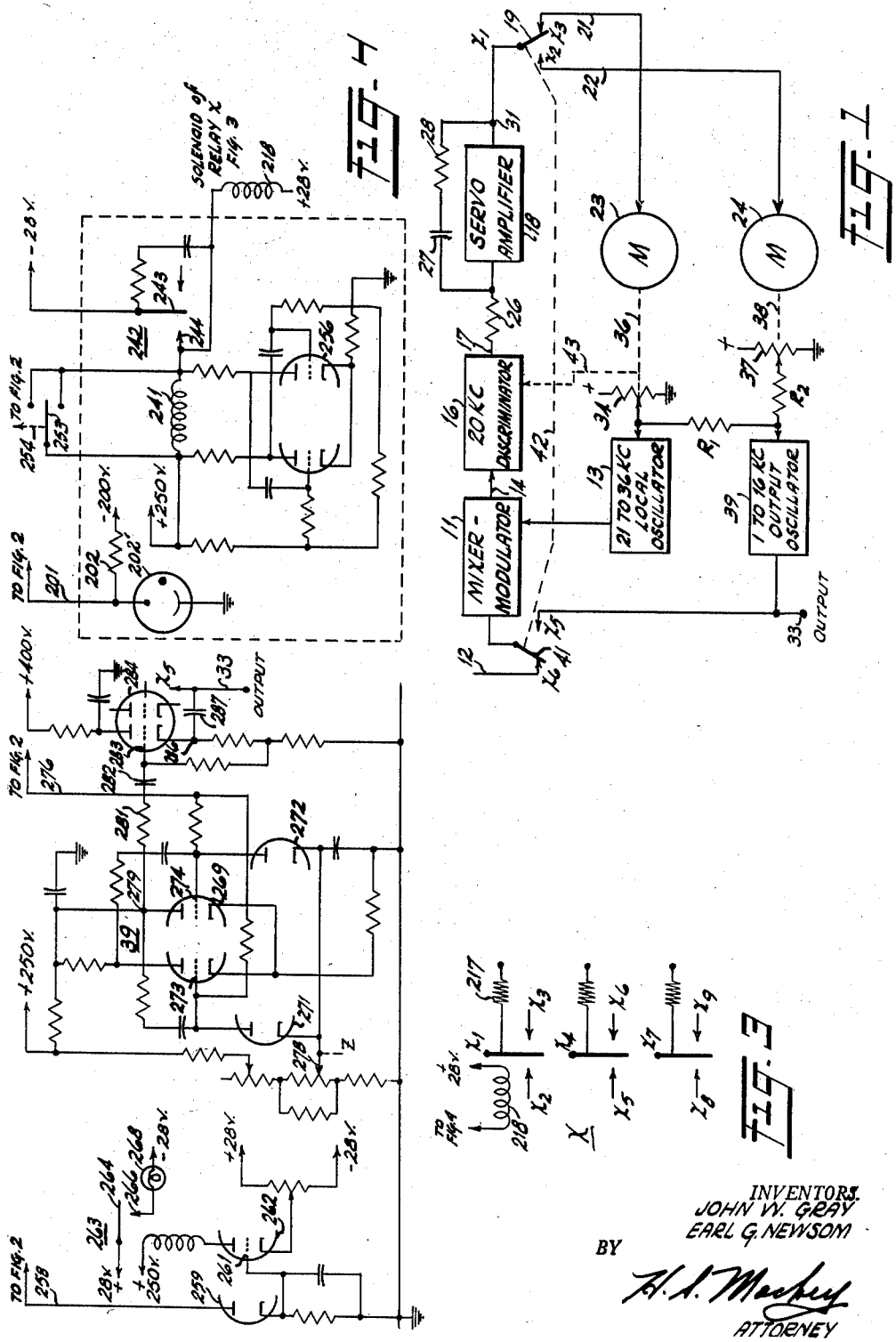

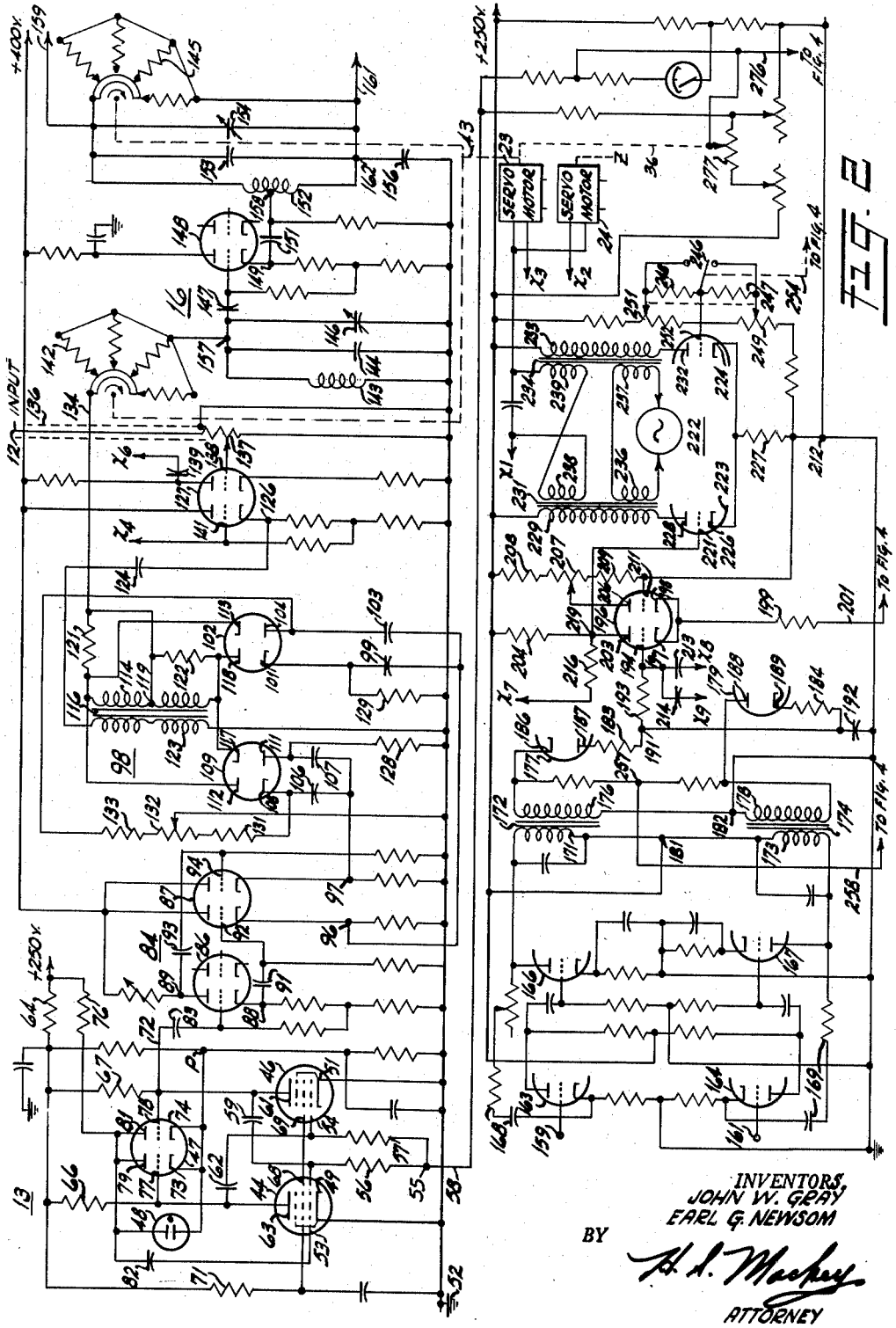

2,870,331

AUTOMATIC SIGNAL FREQUENCY TRACKER

John W. Gray, Pleasantville, and Earl G. Newsom, Thornwood, N. Y., assignors to General Precision Laboratory Incorporated, a corporation of New York Application July 17, 1953, Serial No. 368,792

13 Claims. (Cl. 250—36)

This invention relates to an automatic electrical signal frequency tracker and more specifically to an instrument for locking to and tracking with the varying central frequency of an input signal voltage having a bandwidth of frequencies and emitting output data representative of only the central frequency of the band of frequencies.

The usefulness of this invention generally resides in providing a frequency tracker of high sensitivity combined with high accuracy, for locking electrical equipment to an incoming signal having a frequency that varies in any manner. More specifically the invention is useful in the radar art, in which the echo return may vary in an unpredictable and highly erratic manner, but which must be utilized continuously.

The general object of this invention is therefore to provide an instrument that is receptive to electrical pulses of random and changing magnitude and frequency within a shifting frequency band, locks to the band and follows its shifts, measures and selects only the central frequency of the band, and finally emits output data representative of the central frequency.

A further object is to provide an instrument suitable for deriving useful information from the output of radar equipment which output consists of a modulation frequency potential derived from a radar echo and includes a high proportion of noise voltages, the output being in the nature of a voltage having a shifting or varying band of frequencies, the magnitudes of voltages at the several frequencies within the band being random in distribution and changing fortuitously and rapidly.

Other and further objects will be readily apparent from the following description when taken in consideration with the accompanying drawings in which:

Figure 1 is a simplified diagrammatic representation of the automatic signal frequency tracker of the invention.

Figures 2, 3, and 4 taken together constitute a schematic diagram of the automatic signal frequency tracker diagrammatically illustrated in Fig. 1.

In general the function of the automatic signal frequency tracker of the instant invention is to produce a rectangular voltage wave of constant amplitude whose frequency is equal to the central or average frequency of an input signal. As an example only and as an aid in describing the invention it will be here assumed that the input signal may vary within the frequency range of 1 to 16 kilocycles, although by proper design the invention may be operated by an input signal having any range of frequencies which can be conductively transmitted.

The instrument of this invention is designed to operate under very severe conditions such as exist when the input signal is of the type secured from radar apparatus. The characteristics of such a signal under unfavorable and severe conditions may consist of a frequency band of pulses of voltage which extends over a considerable range on either side of the central frequency, the range in general being proportional to the numerical value of the central frequency in a ratio of about 1 to 10, i. e., if the central frequency is 10 kc. the bandwidth of the input covers a range of 1 kc. whereas at a central frequency of say 2 kc. the bandwidth of the input covers a range of 200 cycles. Likewise, the distribution of voltage magnitudes within the bandwidth is random and changes continuously, and the voltage may indeed go below the threshold value necessary for operation of the instrument and stay there for periods varying from milliseconds to minutes. Additionally, associated with the signal is noise which is distributed randomly over the 1-16 kc. frequency range and has a total energy that at maximum exceeds the signal energy by 16 db. Finally the input signal frequency band shifts in a progressive manner within the frequency range.

A frequency tracker that can track such a signal must be able to perceive the signal through masking noise, to disregard variations of voltage amplitude within the signal spectrum and to find the average frequency of the spectrum. It must lock to that average or central frequency and follow it with reasonable speed as the frequency migrates progressively within the frequency range, which in the example is from 1 to 16 kc. If the input signal becomes weaker than the threshold value, the instrument must "remember" the average or central frequency of the instant before and continue to supply an output voltage of that frequency indefinitely, until the input signal returns in sufficient strength above the noise to actuate the tracker. Because, particularly in radar applications, the level of the input signal continuously varies, the frequency tracker in effect interpolates between the points on a time-frequency curve to produce a continuous curve. The instrument must contain provision for searching over the input frequency range of 1 to 16 kc. when first put into operation or after losing a signal of changing frequency.

Principal and basic characteristics of the instrument of this invention include the employment of a feedback loop to control the output frequency by the input frequency, and the employment of a periodic substitution of the output frequency for the input frequency in this loop to correct component errors, for the purpose of securing an accuracy unobtainable otherwise. This degree of accuracy constitutes not only a quantitative but also a qualitative difference between this instrument and instruments of the existing art such as automatic frequency controls, for not only do the latter lock to non-varying carrier frequencies only, but their accuracy is of the order of 5% whereas that of the invention is of the order of 0.1%.

The output signal consists of a rectangular voltage wave having a frequency equal to the central frequency of the input signal spectrum, the frequency equality being highly accurate.

Figure 1 illustrates in block diagram the circuit of a frequency tracker, the details of which are shown in the schematic diagram of composite Figs. 2, 3, and 4. Referring specifically to Fig. 1, the frequency tracker comprises a mixer or modulator 11 having an input voltage which may, for example, consist of a frequency band and noise applied thereto from line 12, the modulator 11 modulating this input voltage with the output derived from a local oscillator 13. Although there is as has been stated a wide range of frequencies which might be employed, preferably the frequency of the local oscillator 13 is so chosen that the difference between its frequency and that of the input frequency will be 20 kc., it being necessary only that the oscillator frequency is higher than the maximum input frequencies. This difference frequency obtained by the modulator action of the modulator 11 is supplied through line 14 to a 20 kc. discriminator 16. The output of this discriminator 16 is supplied through a connection 17 to a suitable servoamplifier 18 the output of which is supplied alternately through a switch 19 and connections 21 and 22 to servomotors 23 and 24, respectively. The servoamplifier 18 also includes an integrating network comprising the resistor 26 and capacitor 27. This integrating network is an essential part of the frequency tracker when it is operated by signals of the radar type which fluctuate erratically over periods of seconds, and the use of this network enables the output to approximate very closely a running average of the input. It may also be regarded as constituting an electronic "memory" operating over short periods, such as a period of a fraction of a second, in cases of minor lapses of the input signal. The resistor 28 also constitutes a stabilizing element, providing a convenient means of controlling the integrating effect to prevent hunting of the servos.

For reasons which will readily appear hereinafter, the output from the servoamplifier 18 is alternately supplied as before mentioned to the two motors 23, 24 by means of the double-throw switch 19, which is preferably controlled by the output of an independent free-running multivibrator (not shown). The motor 23 operates a voltage divider 34 by means of a mechanical connection 36. The voltage divider 34 controls the voltage supplied to the local oscillator 13 which in turn controls the frequency thereof. Preferably the local oscillator 13 is of a type such that its frequency is a linear function of a D.-C. control potential, such as that supplied from the voltage divider 34. The motor 24 is connected to the potential divider 37 through the mechanical connection 38 and the voltage divider 37 varies the voltage supplied to a second local oscillator 39. The voltage divider 34 constitutes the primary control for the local oscillators 13 and 39 and under automatic control maintains the frequency of the local oscillator 13 at a value that is 20 kc. above the input signal frequency.

The frequencies of the signals generated by the oscillators 13 and 39 are varied substantially in unison but at frequencies 20 kc. apart under the primary control of the adjustment of the contact on the potential divider 34. Resistors $R_1$ and $R_2$ are connected in series between the contacts of the potential dividers 34 and 37, the resistance of resistor $R_2$ being 10 to 20 times larger than $R_1$. Thus, any adjustment of the contact of the potential divider 34 varies the potential of the lower end of resistor $R_1$ and hence the potential applied to the oscillator 39 by a proportional amount.

The local oscillator 39 functions to provide an output signal having at any instant of time only a single frequency which exactly corresponds to the center of the band of frequencies, thus producing a signal free of noise and limited to a single varying frequency rather than a band of frequencies. To this end the frequency of the oscillator 39 must be maintained exactly 20 kc. below that of oscillator 13, the oscillator 13 being servoed by the circuit consisting of the modulator 11, discriminator 16, amplifier 18, motor 23 and potentiometer 34 to generate a signal which is exactly 20 kc. above the center frequency of the input signal.

As heretofore stated, the primary control for the oscillator 39 resides in the change in voltage produced by the adjustment of the potentiometer 34, which also adjusts the frequency of the oscillator 13. However, the characteristics of the oscillators 13 and 39 cannot be made identical over the necessary wide range of variation thereof although they may be made to closely approximate each other. To insure, therefore, that the signal frequency of the oscillator is exactly the same as the center frequency of the input signal band an auxiliary or fine control of the signal frequency of the oscillator 39 is provided by the potentiometer 37, which in turn is periodically reset through the action of the servoamplifier 18 and motor 24.

The manner in which this action occurs may be more readily appreciated by first considering that the switches 41 and 19 mechanically interconnected as indicated at 42 are in the position as shown in Fig. 1. In such instance the input band of signal frequencies is mixed in the modulator with the signal generated by the oscillator 13 to produce a difference frequency output which is desired to be 20 kc. at all times regardless of the variation of input frequency. If this is the case the discriminator output is zero, there is no input signal applied to the servoamplifier 18 and the motor 23 and hence the contact of the potentiometer 34 is not operated. Assume, however, that for any reason the center frequency of the input signal departs from its previous value. Under such circumstances the input signal as applied to the discriminator 16 will have a frequency other than 20 kc. being either above or below that frequency depending on the direction of departure of the input signal frequency from the value first assumed. In such case the output of the discriminator departs from zero in one sense or the other in direct linear relation to the departure of the input signal frequency from the median of 20 kc. This output acting through the servoamplifier 18 constitutes a motive force for the motor 23 which in turn adjusts the potentiometer 34 to apply such a voltage to the input of the oscillator that the frequency of signals generated thereby is changed by a sufficient amount to produce, when mixed with the input signal frequency band a center difference frequency of exactly 20 kc. Thus regardless of the center frequency of the input signal frequency, the oscillator 13 is made to track therewith at a frequency exactly 20 kc. greater at all times. This described adjustment also varies the signal frequency of the oscillator 39 through the medium of the voltage divider network consisting of resistors $R_1$ and $R_2$ acting in the manner discussed above so that basically the oscillator 39 is tracked with oscillator 13 at a frequency 20 kc. below that of oscillator 13.

In any practical oscillator circuits, however, it is impossible to provide arrangements whereby proportional changes of input voltage will produce exactly proportional changes in frequency of output signals over the entire range. Thus the adjustment of oscillator 13 in accordance with the new input signal frequency may not be reflected in an exactly equal and proportional change in signal frequency of the oscillator 39 and therefore the new output frequency thereof may not be exactly equal to the center frequency of the input signal band. To prevent such drift and inaccurate operation the switches 19 and 41 are periodically actuated in unison in any suitable manner as by the output of a multivibrator or the like and it has been found suitable to connect the contacts 19 and 41 as illustrated for 36 seconds out of each 40 seconds the remaining 4 seconds being occupied by engagement of contacts $X_2$ and $X_5$.

When in this latter position the input signal is disconnected from the input of the modulator 11 and the output of the oscillator 39 is substituted therefor. At the same time the output of the servoamplifier 18 is connected to the motor 24 which adjusts the potentiometer 37 to provide a fine or corrective adjustment of the oscillator 39.

It will be apparent that if at the time of switching the contacts the output frequency of the oscillator 39 does not correspond exactly to the input signal center frequency, the difference frequency between the signal of the oscillators 13 and 39 will not be exactly 20 kc. and any such discrepancy will act through the discriminator 16, servoamplifier 18, motor 24 and potentiometer 37, in the manner described in connection with the adjustment of oscillator 13, to adjust the frequency of the signal generated by oscillator 39 until it departs from the signal generated by the oscillator 13 by exactly 20 kc. and hence is identical with the center frequency of the input signal band.

The discriminator 16 as indicated passes a fixed band of signal frequencies centered about 20 kc. and it is desirable that the band of frequencies impressed thereon not only always remains within the linear portion of the discriminator characteristic but also that at all times the signal band of frequencies impressed thereon occupy a greater part of this linear operating characteristic. As stated, heretofore, however, the bandwidth of input signals is a function of the numerical frequency of the center of the band, there being a relatively wider band of frequencies impressed at high frequencies compared to the bandwidth at low frequencies. Thus it is desirable that the linear portion of the discriminator characteristic vary in width or range depending on the input signal frequency and that the discriminator have a Q inversely proportional thereto. Such a control is not critical and may constitute adjustment by means of variable resistors suitably located as will be described hereinafter. These resistors are controlled by the mechanical connection 43 operated in unison with the adjustment of potentiometer 34.

It is to be expected, when the automatic signal frequency tracker is employed in conjunction with radar equipment, that the signal input will be somewhat erratic in frequency so that the error signal will be subject to rapid variations to which the motor 23 should not respond. On the other hand, the frequency tracker should not saturate and should linearly store all the error fluctuations and cause more gradual control of the motor so that the average error will be substantially zero. This is accomplished by the previously mentioned integrating control exercised by resistor 26 and condenser 27.

This integrating RC network constitutes a Miller negative feedback circuit around a part of the servoamplifier 18. This amplifier has an extremely high effective gain so that the voltage at its input remains substantially zero because of the feedback action. Also, the effective time constant, since it contains as a factor the amplifier gain, is extremely high, so that the output voltage level is maintained indefinitely during periods of lapse of input signal.

The servomechanism loop thus shown and described is termed the discriminator position servo system loop or more specifically the discriminator position servomechanism loop. It consists of the major components oscillator 13, mixer-modulator or modulator 11, discriminator 16, servoamplifier 18, servomotor 23 and control voltage divider 34. This servo loop receives as input the input signal from input conductor 12 and has an output consisting of the direct-current voltage of the silder of voltage divider 34 which is supplied to the output oscillator 39 for its control.

The output terminal 33 of the output oscillator 39 in turn constitutes the output terminal of the automatic signal frequency tracker and the functioning of the discriminator position servomechanism loop maintains voltage of constant frequency at this terminal when the frequency tracker input signal fails, maintaining an output frequency representing the last value of input signal frequency. This may be likened to a memory faculty. The instrument "remembers" for an indeterminate length of time which ideally is infinite if all adjustments are correct, in which case in the absence of input signal, pure noise energy is applied to the discriminator resulting in zero input to the servoamplifier, and the motor 23 remains stationary. The slider of the voltage divider 34 then remains at its last position, maintaining control of the oscillators 13 and 39 at their last frequencies.

A second servomechanism loop exists only during each four-second timer correction interval. It consists of the output oscillator 39, modulator 11, discriminator 16, servoamplifier 18, motor 24 and voltage divider 37. It is self-contained and has no external input or output, its function being to eliminate, by readjustment of voltage divider 37, the error accumulated within the output oscillator during each 36-second operation interval.

Referring specifically to Fig. 2, the details of the automatic signal frequency tracker wiring are shown. The local oscillator designated by the numeral 13 in the block diagram of Fig. 1 comprises electronic discharge tubes 44, 46, 47, and 48, Fig. 2, which are associated in a free-running multivibrator circuit. The discharge tubes 44 and 46 are connected in a conventional multivibrator circuit, the tubes 47 and 48 constituting regulator tubes which assure that the local oscillator will always start into oscillation without having to initiate its operation by the use of a manual switch. The discharge tubes 44 and 46 are shown in the specific embodiment as pentodes but it will be readily appreciated that triodes may be used. Also the discharge tube 47 is shown as a duotriode but instead two separate triodes could be used.

This multivibrator circuit is shown and claimed in copending application of John W. Gray, Serial No. 169,971, filed June 23, 1950, now Patent No. 2,653,242, issued September 22, 1953, assigned to the same assignee as the instant application and accordingly it is believed that only a general description is necessary herein. The cathodes 49 and 51 are connected to an electrically common point such as ground indicated at 52. The respective control grids 53 and 54 are connected through resistors 56 and 57 of equal resistance to a common connection 55 which may be one side of a control voltage which is used to control the frequency of the local oscillator. In accordance with conventional practices the grid 53 of the tube 44 is connected by means of a suitable coupling condenser 59 to the anode 61 of the tube 46 and similarly, the control grid 54 of the tube 46 is connected by a coupling condenser 62 to the anode 63 of the tube 44. A suitable positive potential is supplied to the anodes 63 and 61 from a positive source through a common resistor 64 and respective resistors 66 and 67. The respective screen grids 68 and 69 are energized from the positive potential source through common resistor 71. The output from the multivibrator circuit is impressed on the connection 72.

The elements mentioned immediately above constitute the conventional part of a multivibrator circuit for which the tubes 47 and 48 constitute a novel control system which assures that the multivibrator circuit will always start in its oscillation as soon as the power is connected to it. Also the tubes 47 and 48 constitute a novel limiting circuit for maintaining the alternating peak-to-peak potential output at a constant value. The maximum peak voltage is determined by the breakdown potential of tube 48. It is very desirable to limit the rise of the anode voltage to the steepest parts of the exponential curves to produce a more nearly rectangular output. To do this the respective sections of the tube 47 serve as "plate catchers." The alternating peak-to-peak potential is determined by the potential of the point P to which the respective cathodes 73 and 74 are connected in common, the positive peak being determined by reason of the limiting action of the respective sections of the tube 47 while the negative peak potential is fixed at a specific amount above the ground depending upon the pentode tube voltage drop during the maximum anode current flow through its anode resistor 66 or 67.

As is clearly evident from the drawing, the control grid 77 is connected to the anode 63 and the control grid 78 is connected to the anode 61. The two anodes 79 and 81 are connected to the positive high voltage supply through the resistor 76. Associated with the limiter tube 47 is the neon tube 48 which is connected directly across the common terminal of cathodes 73, 74 and the common terminal of the anode 79, 81. A suitable condenser 82 which is connected between the terminal common to one of the electrodes of the neon tube and the anodes 79 and 81 and the control grid 53, causes the neon tube 48 to operate as a relaxation oscillator to provide the necessary pulse to initiate the operation of the multivibrator when power is applied. As is well known it is entirely possible that when a multivibrator of the free-running type is first turned on it may be in such condition that full current flows through both of the tubes, such as tubes 44 and 46, causing the potential of both of the anodes to be at the same potential thus causing the tubes to remain in static condition until some voltage pulse causes the initiation of a regenerative interaction between the tubes to start oscillation.

In the present system the neon tube 48, the condenser 82 and the associated circuit constitute a relaxation oscillator which causes potential surges or pulses to be automatically applied to the multivibrator (tubes 44, 46) until it commences to oscillate at which time the relaxation oscillator becomes inactive. Assuming that the power is applied to the local oscillator 13 causing a charge to build up between the two electrodes of the neon tube 48, it will be apparent from the circuit diagram that as soon as the voltage is applied from the positive source, the neon tube 48 and the condenser 82 will begin to store a charge. As soon as the charge on the neon tube 48 reaches the breakdown voltage this tube will discharge through the condenser 82 and the cathode 49. This cycle will again be repeated after the condenser 82 is recharged and the potential across the electrodes of the neon tube 48 again reaches the ignition potential, the value of the capacitor 82 and the resistor 76 determining the frequency of oscillation. The discharge of the condenser 82 will be to ground through a low impedance circuit including the path between the control grid 53 and the grounded cathode 49. This causes the potential across the neon tube 48 to fall abruptly below its extinction potential. The neon tube 48 will then again commence to recharge at a rate depending upon the values of the resistance and capacitance in the circuit. This process will be repeated until the multivibrator starts into oscillation. The oscillation of the neon tube 48 produces abrupt negative voltage pulses of approximately 20 volts which will be impressed upon the control grid 53 causing a decrease in anode current through tube 44. This pulse is regeneratively supplied through the coupling condenser 62 to the grid 54 of the tube 46 thus starting the multivibrator oscillations. As soon as the multivibrator starts into oscillation the tube 44 and the tube 46 will alternately draw anode current thereby causing the respective anodes 63 and 61 to be near the potential of the point P causing the associated triode section of the tube 47 to draw anode current, thus maintaining the voltage across electrodes of the neon tube 48 below the ignition potential. Thus the neon tube 48 is automatically held out of operation and then has no effect whatever upon the multivibrator operation.

The output from the multivibrator at the connection 72 is supplied through a coupling condenser 83 to a suitable amplifier 84. This amplifier comprises discharge tubes 86 and 87. As is apparent from Fig. 2, the tube 86 has a cathode follower output at terminal 88 and a plate terminal at 89, these two terminals providing a push-pull output which is supplied to the dual triode 87. The output from terminal 88 is supplied through a coupling condenser 91 to the control grid 92 of the tube 87 and the output from terminal 89 is supplied through coupling condenser 93 to the grid 94 of the tube 87. Tube 87 is operated as a cathode follower and delivers push-pull output at terminals 96 and 97.

This push-pull output is supplied to a special two-stage double diode mixer-modulator 98 which, because of its design, has very special characteristics and whereby the opposite ends of the modulation transformer are alternately clamped at substantially ground potential. One of the advantages of the design is that the output from this mixer-modulator does not contain either of the two ;input frequencies. It will be noted from the circuit diagram that the terminal 96 on the tube 87 is coupled by means of a coupling condenser 99 to the cathode 101 of one section of the duodiode 102 and through the coupling condenser 103 is connected to the anode 104 of the other section of the duodiode 102. The terminal 97 on tube 87 is connected through coupling condensers 106 and 107 respectively, to the cathode 108 of one section of the duodiode 109 and to the anode 111 of the other section of the duodiode 109. The anode 112 of the duodiode 109 and the cathode 113 of the duodiode 102 are connected to one side of center tapped winding 114 of modulation transformer 116. The other end of winding 114 is connected to cathode 117 of the duodiode 109 and to the anode 118 of the duodiode 102. The winding 114 is provided with a center tap 119 and a resistor 121 is connected between the center tap and one end of the winding 114 and resistor 122 is connected between the opposite end of this winding and the center tap 119. The primary winding 123 of the modulation transformer 116 is coupled by means of a coupling condenser 124 to terminal 126 which is the cathode follower output terminal of a duodiode amplifier tube 127. The anode 111 of tube 109 is connected to the ground through resistor 128 and the cathode 101 of tube 102 is connected to ground through resistor 129. The cathode 108 of tube 109 is connected through a resistor 131 and a portion of the potential divider 132 to ground, the other portion of the potential divider 132 being in series with a resistor 133, the other end of which is connected to the anode 104 of tube 102. The connections just described and the associated duodiodes 102 and 109 constitute a bridge circuit which applies the push-pull output from the amplifier 84, namely, the output amplifier of the local oscillator previously described, to the modulation transformer 116. The action of the mixer-modulator 98 is to provide at the output conductor 134 the modulation output resulting from the mixing of the input signal and the output of the local oscillator 13. This mixer-modulator output includes the difference of the original frequencies and contains higher frequencies also, but does not contain either of the two original frequencies.

The signal input obtained from the conductor 12 as described in connection with Fig. 1 is connected through a suitably shielded conductor 136, Fig. 2, to a potentiometer 137 and to the first control grid 138 of the mixer-duotriode 127. The output of the first section of the tube 127 is supplied through a suitable coupling condenser 139 and through suitable switch relay contacts $X_4$ and $X_6$, Fig. 3, to the second control grid 141, Fig. 2, of the duotriode 127. The latter section of the duotriode 127 is connected as a cathode follower so that its output terminal 126 is connected through the coupling condenser 124 to the winding 123 of the modulation transformer 116. The modulated output of the modulator is supplied from the center tap 119 through a suitable variable resistor 142 to the input of a special frequency discriminator 16, the output of which is suitably integrated and alternately supplied to servomotors 23 and 24, the functions of which were described in connection with Fig. 1.

As has been mentioned previously, among the essential features of the present invention is the provision of subcomponents which cooperate in a manner to provide an accuracy within tolerances heretofore not obtained. Among the essential features is the provision of circuits which are capable of utilizing a signal when the signal-to-noise ratio is very small. It necessarily follows that this type of system is not readily vulnerable to jamming by any signal other than that one for which the circuits happen to be tuned at the instant and which varies from instant to instant. One of the major contributions in this respect is the special frequency discriminator circuit 16 which has an extremely narrow pass band.

The discriminator 16 comprises a parallel tuning circuit including an inductance 143 and condenser 144, the usual trimming condenser 146 being provided for making vernier adjustments. The parallel tuning circuit constitutes a rejector circuit which has maximum impedance at 20 kc. which is the frequency intended to be passed by the discriminator. Through a suitable coupling condenser 147 the rejector circuit of the discriminator is coupled through an impedance matching device which in the embodiment shown includes a discharge tube 148 connected to operate as a cathode follower. The cathode follower output at terminal 149 is connected through a suitable coupling condenser 151 to another tuned circuit including inductance 152 and condenser 153, the trimming condenser 154 being provided to supplement the condenser 153 for the purpose of providing vernier control. The coupling condenser 156 is of special size to have a large reactance as compared to the inductance of the coil 152 at the resonant frequency. When a signal is supplied to the rejector circuit at the terminal 157, if the signal has substantially frequency to which the rejector circuit is tuned, the rejector will present high impedance to the signal, thereby providing a maximum voltage drop between the terminal 157 and ground. This supplies a maximum signal to the input of the tube 148 thereby developing maximum output at terminal 149 which is impressed in turn on the second tuned circuit at terminal 158. The signal applied to this terminal 158 conductively appears in phase at the terminals 159 and 161. The circuit consisting of the coil 152 and condensers 153 and 154 is sharply tuned to 20 kc. and therefore appears as a pure high resistance to inputs having this frequency. The condenser 156 in series with part of this resistance produces at junction 162 a shift of phase with respect to ground of very nearly 90°. The voltage of tap 158 having a magnitude relative to ground produces in addition to the previously-mentioned voltages at output terminals 159 and 161 additional voltages at 90° thereto, one being added and one subtracted because of reverse flow in coil 152. Resultants at terminals 159 and 161 are, because of designed magnitudes, exactly 90° apart when measured with respect to ground. Therefore the outputs at terminals 159 and 161 when the input is at exactly 20 kc. have equal voltage magnitudes phased 90° apart. However, when the input frequency is higher than 20 kc. one output terminal has a higher magnitude than the other and when the input frequency is lower than 20 kc. the other output terminal has a higher magnitude than the first.

The resistor networks 142 and 145 may be varied to vary the damping of the rejector circuits through the mechanical connection 43 connected to the commutators contacting the resistors of each network so that their Q's are varied inversely relative to the input frequency.

The outputs between the terminal 159 and ground and between the terminal 161 and ground are applied to the respective amplifiers 163 and 164 as indicated by similarly numbered terminals at the lower left of Fig. 2. The amplifier discharge tube 163 is coupled in a conventional manner to amplifier discharge tube 166 and the output of discharge tube 164 is similarly connected in conventional manner to amplifier tube 167. Suitable negative feedback networks 168 and 169 are provided to stabilize the respective amplifiers. It is to be noted that these amplifiers are not connected to operate in push-pull, but instead amplifier tubes 163 and 166 are connected in cascade to amplify the error voltage between the terminal 159 and ground while the discharge tubes 164 and 167 are in cascade to amplify the error voltage between terminal 159 and ground. From the foregoing description it will be readily apparent that the phases between the voltages applied to these amplifiers is not exactly 90° at all times but varies from instant to instant depending upon the respective magnitudes of the error voltages being 90° only when the magnitudes of the error voltages are equal.

The plate output from discharge tube 166 is supplied to the primary 171 of a transformer 172 while the plate output of tube 167 is applied to the primary winding 173 of transformer 174. The output from secondary winding 176 is rectified by a diode 177 while the output of the secondary 178 is rectified by a diode 179. It should be noted here that the primary windings 171 and 173 are connected in series with the common intermediate terminal 181 being connected to the appropriate plate potential while the common terminal 182 between the serially connected secondaries 176 and 178 is connected to ground. Appropriate resistors 183 and 184 are connected in series with the respective diodes 177 and 179. It is to be noted that the cathode 186 of the diode 177 is connected to the outer terminal of secondary 176 while its associated anode 187 serves as the output anode whereas the anode 188 of the diode 179 is connected to the outer terminal of secondary winding 178, the associated cathode 189 serving as the output electrode. It will therefore be apparent that (assuming the windings of the transformers 172 and 174 are wound in the same direction), the polarized outputs from the two diodes 177 and 179 will increase in opposite directions from the ground terminal 182. Accordingly, the common output terminal 191 of the diodes 177 and 179 will float up and down in polarity and magnitude with respect to the terminal 182 depending upon the relative error signals applied to the terminals 159 and 161. A suitable bypass condenser 192 is provided to bypass all of the alternating current component from the terminal 191 to ground.

The output from terminal 191, which is dependent upon the error signal developed as a result of the input signal is used to control the operation of the servomotors 23 and 24, the general operation of which was described in connection with Fig. 1. To this end, the terminal 191 is connected through a suitable coupling resistor 193 to the control grid 194 of a duotriode 196 which is connected to operate as a differential amplifier. The two cathodes 197 and 198 are directly connected through a common cathode resistor 199 to conductor 201 and a resistor 202 (see Fig. 4) to a suitable source of negative potential. A voltage regulator tube 202' maintains a constant potential of −105 volts. The anode 203 is connected through resistor 204 to a source of positive potential. The other anode 206 is connected to a potential divider 207 which in turn is connected between resistors 208 and 209 which are across the source of potential. The other control grid 211 is connected to the lower end of resistor 209 and to ground at 212. A suitable integrating network of the resistance capacity type is connected in series with the input of the duotriode 196, consisting of the resistor 193 in series and either condenser 213 or 214 in shunt, serving as Miller feedback by connection between the grid 194 and the anode 203. The resistor 216 is placed in series with the condenser to prevent any tendency to oscillation and to stabilize servo operation. The condensers 213 and 214 are alternately connected in the circuit with resistance 216 through the armature $X_7$ of the relay X, Fig. 3, as it engages contacts $X_8$ and $X_9$ alternately as will be pointed out hereinafter. All of the armatures of the relay X are biased against the right hand contacts by springs, for example spring 217, and the armatures are moved against the left hand contacts by the energization of relay solenoid 218. It is to be noted that the capacity of condenser 213 is approximately 2½ times the capacity of condenser 214 for the purpose of varying the time constant of this integrating network because the output from the differential amplifier 196 is adapted to alternately control the operation of servomotor 23 and servomotor 24, the servomotor 23 being larger than servomotor 24 and therefore having greater inertia, and requiring the employment of a larger integrating condenser.

The integrating condensers 213 and 214 are generally represented in Fig. 1 by the condenser 27, and as stated in connection with Fig. 1 the main purpose of the integrating network is to produce an output representative of a running average of the input, so that a reliable and true output signal can be produced even when the input signal is extremely erratic. The arm $X_7$ of the relay X is normally biased by means of its spring (Fig. 3) against contact $X_9$ so that the condenser 214 is normally connected in series with the resistor 216 between the grid 194 and the anode 203. Therefore, energization of the relay X causes the arm $X_7$ to be pulled away from contact $X_9$ and against contact $X_8$, thereby connecting condensers 213 in series with the resistor 216.

The integrating amplifier comprising duotriode 196 may be said to have a short-time memory function that is nevertheless long compared with variations probable in the input signal, this function being implicit in the integration mode of operation.

If a positive error signal be applied to the grid 194, anode current is drawn through the common cathode resistor 199, raising the potential of the cathode 198 relative to its grounded grid 211 and consequently reducing the current through its anode 206 by approximately as much as the conjugate current has increased. This differential amplifier thus amplifies all direct current voltage changes of either sense appearing at the output terminal 191 of the previous amplifier. It is to be noted however, that the condenser 192 bypasses any alternating voltage at terminal 191 to ground thereby causing the control grid 194 to be tied to ground as far as alternating current is concerned. Therefore, the amplifier 196 is substantially insensitive to any frequencies which are bypassed by the condenser 192 without appreciable impedance drop.

The output terminal 219 of the amplifier 196 is connected to control grid 221 of a second differential amplifier 222 comprising a duotriode 223. The amplifier 222 has associated with it an electromagnetic amplifier employing saturable control transformers which controls the speed and direction of the servomotors 23 and 24. This electromagnetic controller constitutes the final amplification stage of the servoamplifier, and is generally represented in Fig. 1 as part of the servoamplifier 18.

The electromagnetic controller operates as follows. The two cathodes 224 and 226 are connected through a common resistor 227 to ground at 212. The anode 228 is connected to energize the winding 229 of saturable control transformer 231. Similarly the anode 232 is connected to winding 233 of a second saturable control transformer 234. The saturable control transformer 231 is provided with a sectional winding 236, one side of which is connected in series with sectional winding 237 of the saturable control transformer 234. The two remaining terminals of these windings are connected respectively to a suitable source of alternating current preferably of 110 volts at 400 cycles or any appropriate voltage and frequency from which the servomotors 23 and 24 are adapted to be energized. The saturable control transformer 231 is also provided with a second sectional winding 238 one side of which is connected to the terminal $X_1$ of the relay X (Fig. 3), and the other side of this winding is connected to one terminal of a second sectional winding 239 of the saturable control transformer 234.

As will be noted from the circuit diagram, the windings 238 and 239 are so connected relative to their direction of winding that the voltages induced therein by the respective windings 236 and 237 are in opposition. Accordingly, it will be understood that as the plate current from one of the anodes, for example anode 228, increases, that current passing through the winding 229 will cause saturation of the core, thereby reducing the impedance of winding 238. The motors 23 and 24 are of the two phase type; one field winding of each of these motors is continuously energized and the other quadrature field winding is energized by the control phase which is supplied through the armature $X_1$ of the relay X and the contacts $X_3$ and $X_2$. Unequal currents from the anodes 228 and 232 will cause the magnitude and sense of the control phase to change, thereby determining the direction and speed of rotation of the motor 23 or 24, whichever is connected at the time in accordance with the sense and magnitude of the error signal applied to the servomechanism.

In order to make precision operation of this instrument possible, as was described in connection with Fig. 1, the switches 19 and 41 are provided in order to energize the servomotor 24 for 4 seconds of each 40 seconds for the purpose of realigning the output oscillator 39. These switches comprise, respectively, the armature $X_1$ and contacts $X_2$ and $X_3$ of the relay X, Figs. 2 and 3, and the armature $X_4$ and contacts $X_5$ and $X_6$ of relay X, Figs. 2, 3 and 4. The operation of relay X is effected by a free-running timing multivibrator as illustrated in Fig. 4.

This multivibrator comprises a duotriode 256 and is of conventional construction, one of the anode circuits of the multivibrator including actuating solenoid 241 of relay 242, the armature 243 of which is adapted to engage contact 244. As shown in the drawing, the armature 243 is connected to a −28 volt source and is in the circuit for energizing the solenoid 218 of relay X, the other side of the contacting solenoid 218 being connected to the positive side of the same 28 volt source.

In view of the fact that the characteristics of the automatic frequency control are such that if the control gets too far away from the center of the frequency there is a tendency for the servomotors 23, 24 to drive the frequency of the local oscillators further away, suitable manually operated means are provided for manually searching the entire frequency range. To this end the double-throw single-pole switch 246 (Fig. 2) is provided for the purpose of alternatively short circuiting resistors 247 and 248. The resistances 247 and 248 are connected in parallel with voltage dividers 249 and 251, the junction point of the two resistors 247 and 248 being connected to the second control grid 252 of the duotriode amplifier 223. It will be readily apparent that when the armature of the switch 246 is moved in either direction to short one of the resistances an abrupt change will be made in the bias on the grid 252 so that through the operation of the associated electromagnetic amplifier the operation of the servomotor 23 will be effected at full speed in either direction, it being understood of course that this servomotor controls the primary frequency control. An additional single-pole double-throw switch 253 (Fig. 4) is mechanically coupled to the switch 246 through the mechanical connection 254 so that when the manual search switch 246 is closed in either position the solenoid 241 is short-circuited which in turn prevents the contacts 243 and 244 from being closed and solenoid 218 of the relay X from being energized, causing the armature $X_1$ of the relay to remain in engagement with the contact $X_3$ so that the circuit of the control phase to servomotor 23 is unbroken. The relay coil 241 is normally energized by the free-running multivibrator 256 in the manner previously described but the manual control provided by the switch 246 makes it possible to override the action of the multivibrator when desired.

Appropriate means are provided for operating a signal lamp when the input energy is unusable. This may occur, for instance, if the input signal is secured from radar equipment and momentarily the radar echo return is so weak as to be lost in the noise. To this end, the joint output of both servoamplifier error signal channels is secured from terminal 257 (see Fig. 2) and is conducted through conductor 258 to a diode 259, Fig. 4. From the diode 259 the output D.-C. potential is supplied to the grid 261 of the triode 262. The anode current of triode 262 is adapted to energize the solenoid of a marginal relay 263 provided with an armature 264 which engages or disengages contact 266 depending upon the value of the anode current of the triode 262. The function of this relay 263 is to light a lamp 268 during periods when the input signal is sufficiently strong, and to keep the lamp unlighted when the input signal is too weak to be useful or is absent.

The principal utility of the weak signal lamp indicator is to aid in initially finding an input signal by sweeping the frequency of the local oscillator through its range. Upon finding a signal the lamp 268 lights and the switch 246 is opened by the operator, whereupon the frequency tracker locks to the input signal and tracks it. If the input signal strength falls momentarily to zero, the memory function is exercised, as has been described, until the signal reappears, which it ordinarily does at the same frequency that it had upon disappearing.

The second local oscillator corresponding to the local oscillator 39 of Fig. 1 comprises a conventional free-running multivibrator having a duotriode 269, Fig. 4. This multivibrator is of conventional construction and complete description of details is therefore believed to be unnecessary. Suitable diodes 271 and 272 are connected in the control grid input circuits of the two respective sections of triode 269 for the purpose of limiting the input signal. The frequency of oscillation of the local oscillator 39 is controlled by the voltage applied to the control grids 273 and 274 which is supplied through the connection 276 from the voltage divider 277, Fig. 2, the arm of which is driven by the servomotor 23 through the mechanical connection 36. This variable voltage control corresponds to the simplified form represented by the potentiometer 34 shown in Fig. 1.

The bias of the cathodes of the diodes 271 and 272 is controlled by the potentiometer 278 which is controlled by the servomotor 24 through the mechanical connection Z (see Figs. 2 and 4). This potentiometer and control is represented diagrammatically in Fig. 1 by the potentiometer 37. The output from the local oscillator 39, Fig 4, is taken from the anode circuit of one section of the duotriode 269, for example, at terminal 279 through resistor 281 which is connected through coupling condenser 282 to the grid 283 of the cathode follower amplifier 284.

The output from this amplifier is taken from cathode terminal 286 through a coupling condenser 287 to an instrument output terminal 33, where the output energy may be utilized to drive any desired equipment depending on frequency for its indication or operation.

As was mentioned previously, the switch 41, Fig. 1, through contacts $X_4$ and $X_6$, Fig. 3, connects the signal input from conductor 12 through amplifier 127 to the grid 141, Fig. 2, of the input cathode follower amplifier. During 4 seconds out of every 40 seconds, however as timed by the timing multivibrator 256, Fig. 4, the armature of switch 41, Fig. 1, is moved to its contact $X_5$. This contact $X_5$ is also shown in Fig. 4 as a conductor connected to the output terminal 33. The motor 24 is thereby enabled during the allotted 4-second period to correct the adjustment of potentiometer 278 until the output frequency at conductor $X_5$ produces zero error signal at the output of the discriminator 16.

What is claimed is:

1. An automatic signal frequency tracker comprising, a signal input circuit on which there is adapted to be impressed a band of signal frequencies variable over a range of frequency, a first adjustable oscillator the frequency of whose signal output depends on the amplitude of potential impressed thereon, a second adjustable oscillator the frequency of whose signal output depends on the potential impressed thereon, a first potentiometer having a potential impressed thereacross and a movable contact connected to impress the potential applied thereto to said first adjustable oscillator, a second potentiometer having a potential impressed thereacross and a movable contact, a potential divider connected between the movable contacts of said first and second potentiometers, means for impressing the potential existing across a portion of said potential divider on said second oscillator to control the frequency of the output signal thereof, a mixer having the output of said first oscillator impressed thereon, switch means for alternately connecting said mixer to said signal input circuit and to the output of said second oscillator, a fixed frequency discriminator having its input coupled to the output of said mixer producing a control signal when the output of said mixer departs from said fixed frequency, a first motor coupled to position the movable contact of said first potentiometer, a second motor coupled to position the movable contact of said second potentiometer and switch means for alternately imposing said control signal on said first and second motors, said second mentioned switch means being interlocked for simultaneous actuation with said first mentioned switch means.

2. An automatic signal frequency tracker comprising, a signal input circuit on which there is adapted to be impressed a band of signal frequencies variable over a frequency range and whose bandwidth is proportional to the center frequency thereof, a first adjustable oscillator the frequency of whose signal output depends on the amplitude of potential impressed thereon, a second adjustable oscillator the frequency of whose signal output depnds on the potential impressed thereon, a first potentiometer energized by a potential source and having a movable contact connected to impress the potential applied thereto to said first adjustable oscillator, a second potentiometer energized by a potential source and having a movable contact, a potential divider connected between the movable contacts of said first and second potentiometers, means for impressing the potential existing across a portion of said potential divider on said second oscillator to control the frequency of the output signal thereof, a mixer having the output of said first oscillator impressed thereon, switch means for alternately connecting said signal input circuit and the output of said second oscillator to said mixer, a fixed frequency discriminator having its input coupled to the output of said mixer producing a control signal when the output of said mixer departs from said fixed frequency, a first motor connected to position the movable contact of said first potentiometer, a second motor connected to position the movable contact of said second potentiometer, switch means connected to alternately impose said control signal on said first and second motors, said second mentioned switch means being interlocked for simultaneous actuation with said first switch means, and means operated by said first motor for adjusting the damping of said discriminator.

3. An automatic signal frequency tracker comprising, a signal input circuit adapted to have a band of signal frequencies whose spectrum of frequencies is variable over a range of frequency impressed thereon, a first adjustable oscillator, a second adjustable oscillator, primary means operated in accordance with the frequency of said band of signal frequencies for simultaneously adjusting the signal frequencies of said first and second oscillators to correspond respectively to the frequency of a preselected portion of said band of signal frequencies, and secondary means operated by the output of said second oscillator for correcting the output signal thereof to insure accurate correspondence thereof with the frequency of the signal frequency of said first oscillator.

4. An automatic signal frequency tracker comprising, a signal input circuit adapted to have a band of signal frequencies whose spectrum of frequencies is variable over a range of frequency impressed theoron, a first adjustable oscillator, a second adjustable oscillator, primary means operated in accordance with the frequency of said band of signal frequencies for simultaneously adjusting the signal frequencies of said first and second oscillators to correspond respectively to the frequency of a preselected portion of said band of signal frequencies, secondary means operated by the output of said second oscillator for correcting the output signal thereof to insure accurate correspondence thereof with the frequency of the signal frequency of said first oscillator, and means for alternately actuating said primary and secondary means.

5. An automatic signal frequency tracker comprising, a signal input circuit adapted to have a band of signal frequencies whose spectrum of frequencies is variable over a range of frequency impressed thereon, a first adjustable oscillator, a second adjustable oscillator, primary means operated in accordance with the frequency of said band of signal frequencies for simultaneously adjusting the signal frequencies of said first and second oscillators to correspond respectively to the frequency of a preselected portion of said band of signal frequencies, secondary means operated by the output of said second oscillator for correcting the output signal thereof to insure accurate correspondence thereof with the frequency of the signal frequency of said first oscillator, and means for interrupting said signal intput circuit during operation of said secondary means.

6. An automatic signal frequency tracker comprising, a signal input circuit adapted to have a band of signal frequencies whose spectrum of frequencies is variable over a range of frequency impressed thereon, a first adjustable oscillator, a second adjustable oscillator, primary means operated in accordance with the frequency of said band of signal frequencies for simultaneously adjusting the signal frequencies of said first and second oscillators to correspond respectively to the frequency of a preselected portion of said band of signal frequencies, secondary means operated by the output of said second oscillator for correcting the output signal thereof to insure accurate correspondence thereof with the frequency of the signal frequency of said first oscillator, means for alternately actuating said primary and secondary means, and means for interrupting said signal circuit during operation of said secondary means.

7. An automatic signal frequency tracker comprising, a signal input circuit adapted to have a band of signal frequencies variable over a range of frequencies impressed thereon, first and second oscillators the output signal frequency of each of which is proportional to the magnitudes of the respective potentials impressed thereon, a first potential adjusting means connected to each of said oscillators, a first motive means connected to operate said first potential adjusting means, a second potential adjusting means connected to said second oscillator, a second motive means connected to operate said second potential adjusting means, servo circuit means having the output of said first oscillator impressed thereon, said servo circuit means having an output the magnitude of which is controlled in accordance with the beat frequency of the signal input applied thereto and the output of said first oscillator, and switching means for alternately connecting the output of said servo circuit means to said first and second motive means and the input thereof to said signal input circuit and the output of said second oscillator.

8. An automatic signal frequency tracker comprising, a signal input circuit adapted to have a band of signal frequencies variable over a range of frequencies impressed thereon, first and second oscillators the output signal frequency of each of which is proportional to the magnitudes of the respective potentials impressed thereon, a first potentiometer having a movable contact connected to impress potentials proportional to the potential applied thereto on each of said oscillators, a first motor connected to adjust the position of said contact, a second potentiometer having a movable contact connected to impress a potential proportional to the potential applied thereto on said second oscillator, a second motor connected to adjust the position of said last mentioned contact, servo circuit means having the output of said first oscillator impressed thereon, said servo circuit means having an output the magnitude of which is controlled in accordance with the beat frequency of the signal input applied thereto and the output of said first oscillator, first switch means alternately connecting the output of said servo circuit means to said first and second motors, and second switch means mechanically interconnected to said first switch means and operated in unison therewith alternately connecting said signal input circuit and the output of said second oscillator to the input of said servo circuit means.

9. An automatic signal frequency tracker comprising, a signal input circuit adapted to have a band of signal frequencies variable over a range impressed thereon, a first adjustable oscillator, means for mixing the output signal of said first adjustable oscillator and said band of signal frequencies to produce a difference frequency the center frequency of which has a selected value, means for producing a control signal whose amplitude and sense depends on the amount and direction of departure of said center frequency from said selected value, a second adjustable oscillator having a signal output frequency which differs from the output signal frequency of said first adjustable oscillator by said selected value, means operated by said control signal for readjusting the signal output frequency of said first oscillator in a direction to maintain said center frequency difference at said selected value and simultaneously readjusting the signal output frequency of said second oscillator so that the difference between the frequencies of the output signals of the first and second oscillators tends to be maintained at said selected value, means for impressing the output of said second oscillator on said mixing means and simultaneously interrupting the imposition of said band of signal frequencies thereon, and means operated simultaneously with said last mentioned means for readjusting only the signal frequency of said second oscillator by the control signal produced by said control signal producing means.

10. An automatic signal frequency tracker comprising, a signal input circuit adapted to have a band of signal frequencies variable over a range impressed thereon, a first adjustable oscillator, a mixer having the output signal of said first adjustable oscillator impressed thereon, means for impressing the signal derived from said input circuit on said mixer whereby a difference frequency signal is produced by said mixer, a discriminator tuned to a selected frequency having the difference frequency output of said mixer impressed on its input and producing therefrom a control signal the amplitude and sense of which is a measure of the amount and direction by which the difference frequency output of the mixer departs from said selected frequency, a second adjustable oscillator having a signal output frequency which is less than the frequency which is less than the frequency of the output signal of said first oscillator by an amount substantially equal to said selected frequency, means operated by said control signal for readjusting the signal output frequency of said first oscillator in a direction to maintain said difference frequency signal at said selected frequency and simultaneously readjusting the signal output frequency of said second oscillator so that the difference between the frequencies of the output signals of the first and second oscillators tends to be maintained at a value equal to said selected frequency, means for impressing the output of said second oscillator on said mixer and simultaneously interrupting the imposition thereon of the signal derived from said input circuit, and means operated simultaneously with said last mentioned means for readjusting only the signal output frequencies of said second oscillator by the control signal output of said discriminator.

11. An automatic signal frequency tracker comprising, a signal input circuit adapted to have a band of signal frequencies variable over a range impressed thereon, a first adjustable oscillator, a mixer having the output signal of said first adjustable oscillator impressed thereon, means for impressing the signal derived from said input circuit on said mixer whereby a difference frequency signal is produced by said mixer, a discriminator tuned to a selected frequency having the difference frequency output of said mixer impressed on its input and producing therefrom a control signal the amplitude and sense of which is a measure of the amount and direction by which the difference frequency output of the mixer departs from said selected frequency, a second adjustable oscillator having a signal output frequency which is less than the frequency of the output signal of said first oscillator by an amount substantially equal to said selected frequency, means operated by said control signal for readjusting the signal output frequency of said first oscillator in a direction to maintain said difference frequency signal at said selected frequency and simultaneously readjusting the signal output frequency of said second oscillator so that the difference between the frequencies of the output signals of the first and second oscillators tends to be maintained at a value equal to said selected frequency, means operated by said means for simultaneously readjusting said first and second oscillators for varying the damping of said discriminator, means for impressing the output of said second oscillator on said mixer and simultaneously interrupting the imposition thereon of the signal derived from said input circuit, and means operated simultaneously with said last mentioned means for readjusting only the signal output frequency of said second oscillator by the control signal output of said discriminator.

12. An automatic signal frequency tracker comprising, a signal input circuit adapted to have a band of signal frequencies variable over a range impressed thereon, first and second adjustable frequency oscillators, primary means including a fixed frequency discriminator for simultaneously adjusting the frequencies of the output signals of said first and second oscillators, said primary frequency adjusting means being operated by the output of said first oscillator and the signal impressed on said signal input circuit and so adjusting said first oscillator as to maintain the output signal frequency thereof at a frequency which differs from the center frequency of said band of signal frequencies by the fixed frequency of said discriminator while concomitantly so adjusting said second oscillator as to maintain the output signal frequency thereof at a frequency substantially equal to the center frequency of said band of signal frequencies, and secondary means including said fixed frequency discriminator for solely adjusting the frequency of the output signal of said second oscillator, said secondary frequency adjusting means being operated by the output signals of said first and second oscillators and so adjusting said second oscillator as to maintain the output signal thereof at a frequency which differs from the output frequency of said first oscillator by exactly the fixed frequency of said discriminator.

13. An automatic signal frequency tracker comprising, a signal input circuit adapted to have a band of signal frequencies variable over a range impressed thereon, first and second adjustable frequency oscillators, primary means including a fixed frequency discriminator for simultaneously adjusting the frequencies of the output signals of said first and second oscillators, said primary frequency adjusting means being operated by the output of said first oscillator and the signal impressed on said signal input circuit and so adjusting said first oscillator as to maintain the output signal frequency thereof at a frequency which differs from the center frequency of said band of signal frequencies by the fixed frequency of said discriminator while concomitantly so adjusting said second oscillator as to maintain the output signal frequency thereof at a frequency substantially equal to the center frequency of said band of signal frequencies, and means operated by said primary frequency adjusting means for varying the damping of said fixed frequency discriminator.

References Cited in the file of this patent

UNITED STATES PATENTS

| | | |
|---|---|---|
| 2,398,694 | Case | Apr. 16, 1946 |
| 2,452,601 | Ranger | Nov. 2, 1948 |
| 2,476,840 | Collander | July 19, 1949 |
| 2,523,537 | Mayer | Sept. 26, 1950 |
| 2,617,985 | Collins | Nov. 11, 1952 |